United States Patent
Abram et al.

(10) Patent No.: US 6,272,197 B1
(45) Date of Patent: Aug. 7, 2001

(54) COOLANT MIXING GRID FOR NUCLEAR FUEL ASSEMBLY

(75) Inventors: Timothy James Abram, Fleetwood; John Woodside Gillespie, Preston, both of (GB)

(73) Assignee: British Nuclear Fuels PLC (GB)

( * ) Notice: Subject to any disclaimer, the term of this patent is extended or adjusted under 35 U.S.C. 154(b) by 0 days.

(21) Appl. No.: 09/402,703

(22) PCT Filed: Apr. 8, 1998

(86) PCT No.: PCT/GB98/01040

§ 371 Date: Oct. 6, 1999

§ 102(e) Date: Oct. 6, 1999

(87) PCT Pub. No.: WO98/47153

PCT Pub. Date: Oct. 22, 1998

(30) Foreign Application Priority Data

Apr. 16, 1997 (GB) ................................................ 9707690

(51) Int. Cl.[7] ................................................ G21C 3/322
(52) U.S. Cl. .................. 376/439; 376/347; 376/438; 376/442; 376/443; 376/462
(58) Field of Search .................... 376/347, 462, 376/442, 443, 439, 438

(56) References Cited

U.S. PATENT DOCUMENTS

| 3,158,549 | 11/1964 | Fowler | 176/78 |
|---|---|---|---|
| 3,227,621 | 1/1966 | Hargö et al. | 176/50 |
| 4,135,972 | * 1/1979 | Anthony et al. | 176/78 |
| 4,294,660 | * 10/1981 | Christiansen | 376/442 |
| 4,312,706 | 1/1982 | Snyder, Jr. et al. | 376/442 |
| 4,698,204 | * 10/1987 | Taleyarkhan | 376/439 |
| 4,726,926 | * 2/1988 | Patterson et al. | 376/439 |
| 4,804,516 | * 2/1989 | Thomazet et al. | 376/439 |
| 4,827,063 | 5/1989 | Bökers et al. | 376/439 |
| 4,879,090 | * 11/1989 | Perrotti et al. | 376/462 |
| 4,951,299 | * 8/1990 | Patterson et al. | 376/439 |

(List continued on next page.)

FOREIGN PATENT DOCUMENTS

| 2 253 017 | 10/1972 | (DE) | G21C/3/32 |
|---|---|---|---|
| 0 261 544 A1 | 9/1987 | (EP) | G21C/3/32 |
| 0261544 | * 10/1987 | (EP) | G21C/3/32 |
| 0246962 | * 11/1987 | (EP) | G21C/3/32 |
| 000557085 A1 | * 8/1993 | (EP) | G21C/3/34 |

OTHER PUBLICATIONS

Associated with International Application No. PCT/GB98/01040; filing date Apr. 8, 1998.
International Search Report; PCT/GB98/01040, mailed Jul. 31, 1998.

* cited by examiner

*Primary Examiner*—Michael J. Carone
*Assistant Examiner*—John Richardson
(74) *Attorney, Agent, or Firm*—Myers Bigel Sibley & Sajovec

(57) ABSTRACT

A fuel assembly for a nuclear reactor is described, the fuel assembly including: a plurality of fuel pins (12) extending substantially parallel to the axis of the assembly and to each other; at least two structural grids spaced apart from each other, the grids being in contact with said fuel pins (12) and maintaining said fuel pins substantially mutually parallel and preventing contact therebetween, wherein the fuel assembly further comprises at least one mixing grid (50) situated intermediate said at least two structural grids, the fuel assembly being characterized in that said mixing grid (50) is positioned and fixedly located out of substantial contact with said fuel pins (12), the mixing grid also having turbulence inducing means (61) to promote turbulence in a coolant (62) flowing through said fuel assembly in use and in that the mixing grid is formed from sheet metal wherein the plane of the metal sheet from which the mixing grid is formed lies in a plane which is transverse to the axis of the fuel pin assembly.

13 Claims, 4 Drawing Sheets

U.S. PATENT DOCUMENTS

| | | | |
|---|---|---|---|
| 4,970,048 | * 11/1990 | Noailly | 376/439 |
| 5,180,548 | * 1/1993 | Verdier | 376/439 |
| 5,183,629 | * 2/1993 | Canat et al. | 376/439 |
| 5,263,072 | * 11/1993 | Canat et al. | 376/439 |
| 5,283,821 | * 2/1994 | Karoutas | 376/439 |
| 5,327,472 | * 7/1994 | Kraemer et al. | 376/439 |
| 5,440,599 | * 8/1995 | Rodack et al. | 376/442 |
| 5,530,729 | * 6/1996 | Gustafsson | 376/439 |
| 5,778,035 | * 7/1998 | Nylund | 376/361 |

* cited by examiner

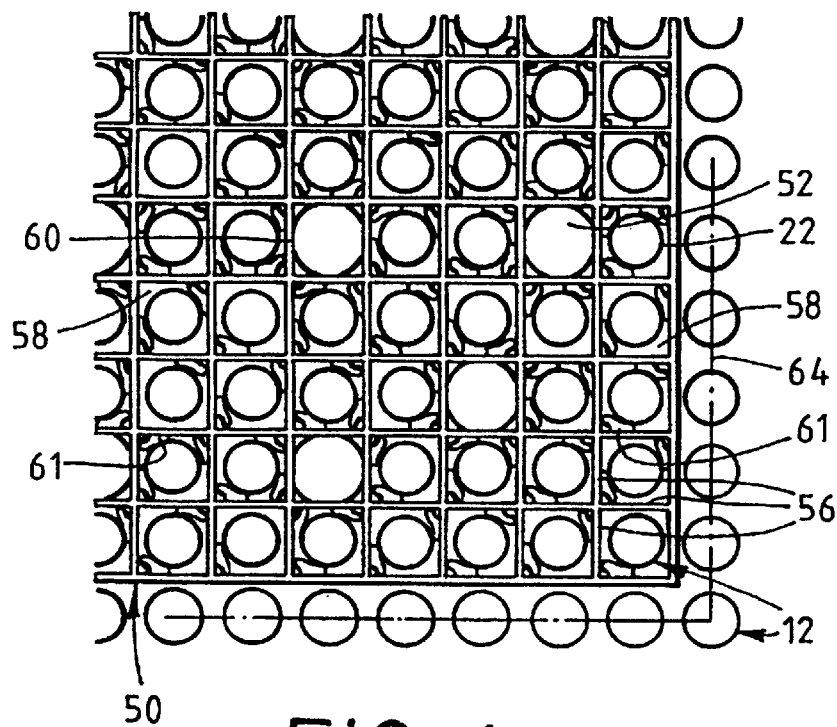
FIG. 4
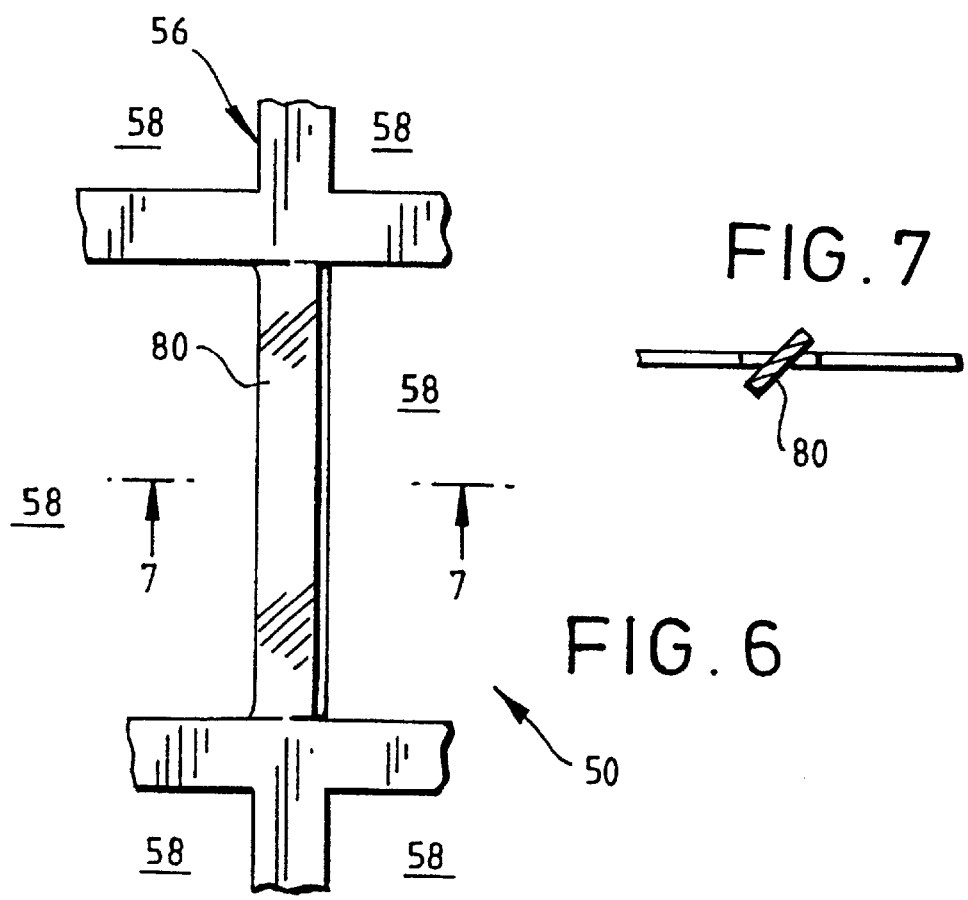
FIG. 7
FIG. 6

COOLANT MIXING GRID FOR NUCLEAR FUEL ASSEMBLY

The present invention relates to fuel rod assemblies for nuclear reactors.

Fuel rod assemblies, or "elements", for nuclear reactors comprise a plurality of parallel fuel rods or pins which are maintained a set distance apart from each other and mutually parallel by grids at the top, bottom and usually at one or more intermediate positions therebetween in the fuel assembly. A further function of the grids is to maintain the fuel pins apart and thereby to prevent fretting of the fuel pins leading to mechanical damage.

Grids employed to the present time are generally constructed by welding together for example many individual components of sheet material to form an array of individual apertures each receiving a fuel pin and having resilient locating means such as "spring fingers" for example formed from the sheet material within the apertures so as to locate the fuel pin as centrally as possible within the aperture. Such grids generally also have vanes integrally formed from the sheet material to induce turbulence in the gas or liquid coolant which flows through the fuel assemblies in a direction generally parallel to the axis of the fuel assembly. The purpose of inducing turbulence in the coolant is to improve the heat extraction from the fuel pins by improved coolant mixing and thus to prevent overheating thereof.

Grids such as those described above are generally fabricated from sheet material wherein the plane of the sheet material is generally parallel to the axis of the fuel assembly and comprise substantial quantities of metal in their construction which is detrimental in that the metal is parasitic in absorbing neutrons from the fuel and reducing power output from the reactor. A typical example of such a mixing grid is described in U.S. Pat. No. 5,183 629.

In a pressurised water reactor (PWR) for example, the individual fuel pins may be about 4 m in length. The fuel pin comprises an outer tubular sheath known as the "cladding" made from a metal alloy such as "Zircaloy"™ for example, within which cladding is the fuel per se. Owing to the high temperature reached by the fuel pin in operation, the outer surface of the cladding is subject to corrosion and oxidation where it is in contact with the coolant. The maximum depth of corrosion or thickness of oxide corrosion product of the cladding occurs at about 80% up the length of the pin from the point of entry of the coolant into the fuel pin assembly. The maximum allowable thickness of the oxide layer is a potential life-limiting factor of the fuel pin and consequently of the fuel assembly. Therefore, it is desirable to improve the cooling of the cladding in at least this region so as to reduce the rate of corrosion of the cladding.

An improvement of the cooling of the cladding to reduce the rate of corrosion also may have the effect of delaying or providing a greater safety margin prior to the onset of departure from nucleate boiling (DNB) and allowing the fuel assembly to be operated at a higher power level than would otherwise be possible. Nucleate boiling is the most efficient form of heat extraction. DNB occurs where a film of steam occurs at the surface of the fuel pin and heat transfer from the pin to the coolant decreases dramatically resulting in failure of the pin within a very short time.

According to a first aspect of the present invention, there is provided a fuel assembly for a nuclear reactor, the fuel assembly including: a plurality of fuel pins extending substantially parallel to the axis of the assembly and to each other; at least two structural grids spaced apart from each other, the grids being in contact with said fuel pins and maintaining said fuel pins substantially mutually parallel and preventing contact therebetween, wherein the fuel assembly further comprises at least one mixing grid situated intermediate said at least two structural grids, the fuel assembly being characterised in that said mixing grid is positioned and fixedly located out of substantial contact with said fuel pins, the mixing grid also having turbulence inducing means to promote turbulence in a coolant flowing through said fuel assembly in use and in that the mixing grid is formed from sheet metal wherein the plane of the metal sheet from which the mixing grid is formed lies in a plane which is transverse to the axis of the fuel pin assembly.

The mixing grid of the fuel assembly according to the present invention may alternatively be formed from wire for example and being joined by welding for example at positions where wires cross and also having turbulence inducing means such as vanes for example attached to the wires.

However, in a preferred embodiment of the fuel assembly of the present invention, the mixing grid may be formed from sheet metal by for example pressing or stamping wherein the plane of the metal sheet from which the mixing grid is initially formed lies in a plane which is transverse to the axis of the fuel pin assembly.

The thickness of the sheet material may be in the range from 0.5 mm to about 1 mm for example. However, the thickness is not considered to be critical and may be chosen so as to be resistant to forces imposed by the coolant flow whilst allowing easy mechanical forming thereof.

The mixing grid may be in the form of a framework having an array of apertures of predetermined size and shape, such as square, triangular or hexagonal for example, and through which the fuel pins extend, preferably without making any significant contact with the surrounding framework of each aperture.

Where formed from sheet metal as described above by pressing or stamping, turbulence inducing means such as vanes may be integrally formed during such a forming operation and deformed away from a position lying in the sheet plane to a desired angle so as to provide the optimum turbulence inducing effect. Such turbulence inducing means may be formed on an inner edge or edges of each or any apertures as desired consistent with producing the optimum desired turbulence. In view of the many different designs of fuel pin assembly in existence, the optimum configuration and distribution of turbulence inducing means may be determined by experimentation.

Some or all of the framework members surrounding each aperture may be twisted about the plane of the sheet so as to form turbulence inducing features per se. Such twisting may also reduce the pressure increase necessary to pump coolant through the fuel pin assembly.

The overall outer boundary shape of the mixing grid will correspond to the particular fuel pin assembly into which it is being assembled and may for example be square or hexagonal.

The mixing grid of the fuel pin assembly according to the present invention may not extend to and encompass the outer peripheral ring of full pins. The reason for this is that the fuel pins in the outer peripheral ring tend to run cooler than inner fuel pins and thus, the degree of corrosion is less under normal operating conditions. A further advantage of the mixing grid not extending to the outer ring of fuel pins is that the risk of snagging of the fuel assembly during insertion into and removal from the reactor core is lessened.

The mixing grid of the fuel pin assembly of the present invention may be held in position within the fuel pin assembly by, for example, so-called thimble tubes in which reactor control rods run; the appropriate grid apertures being sized so as to be located by welding or swaging thereto for example. Alternatively, in a preferred embodiment of the present invention, short stub tubes may be fixed to the mixing grid by welding, for example, at positions which correspond to some or all of the thimble tubes such that the short tubes fit over the thimble tubes and are in turn fixed, by crimping or welding for example, to the thimble tubes.

Determination of the optimum position or positions of mixing grids within the fuel pin assembly may be determined by experimentation and will vary according to the fuel pin assembly design, the type of coolant and/or the type of reactor in question. Sufficient mixing grids may be employed such that the maximum temperature of the hottest fuel pin or pins are reduced to a level where cladding corrosion does not restrict the burn-up life of the fuel.

Improved mixing of the flowing coolant by inducing turbulence therein appears to occur in known fuel pin assemblies in the regions immediately preceding and immediately following a structural grid. Therefore, it might be thought that the inclusion of known structural grids in additional positions within the fuel assembly would be advantageous in promoting extra turbulence to improve cooling and heat extraction in desired locations so as to reduce corrosion/oxidation rate. However, this solution has several significant disadvantages. Firstly, prior art structural grids are extremely expensive to produce owing to their complex structure. Secondly, known structural grids contain substantial quantities of metal which absorbs neutrons causing significant parasitic power loss. Thirdly, additional structural grids provide additional locations where grid-to-rod fretting damage can occur. The mixing grid of the fuel pin assembly of the present invention on the other hand is simple and cheap to make as it may be formed from a single stamping or pressing of an initially flat metal sheet; it contains only a relatively small quantity of metal so that parasitic losses due to neutron capture are minimal; and, the fuel pins of the preferred embodiment do not touch the mixing grid and therefore there can be no fretting damage to the fuel pin caused by the mixing grid.

According to a second aspect of the present invention, there is provided a mixing grid for a fuel pin assembly according to the first aspect.

In order that the present invention may be more fully understood, examples will now be described by way of illustration only with reference to the accompanying drawings, of which:

FIG. 4 shows a plan view of the embodiment of FIG. 3;

FIG. 6 shows a plan view of a small section of a mixing grid; and

FIG. 7 which shows a cross section on the line 7–7 of FIG. 6.

Figure 1:
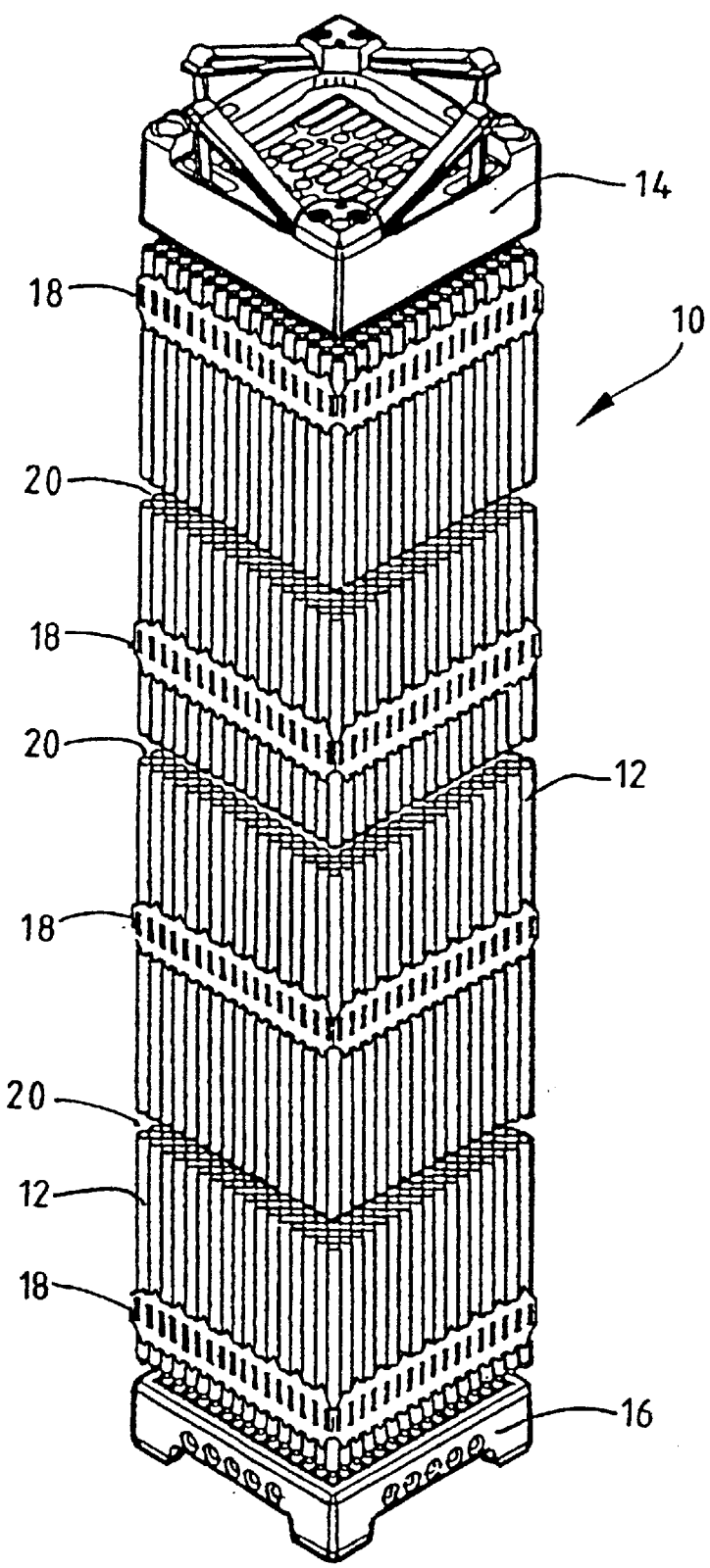
FIG. 1 shows a perspective view of part of a prior art fuel pin assembly for a PWR nuclear reactor.
Figure 2:
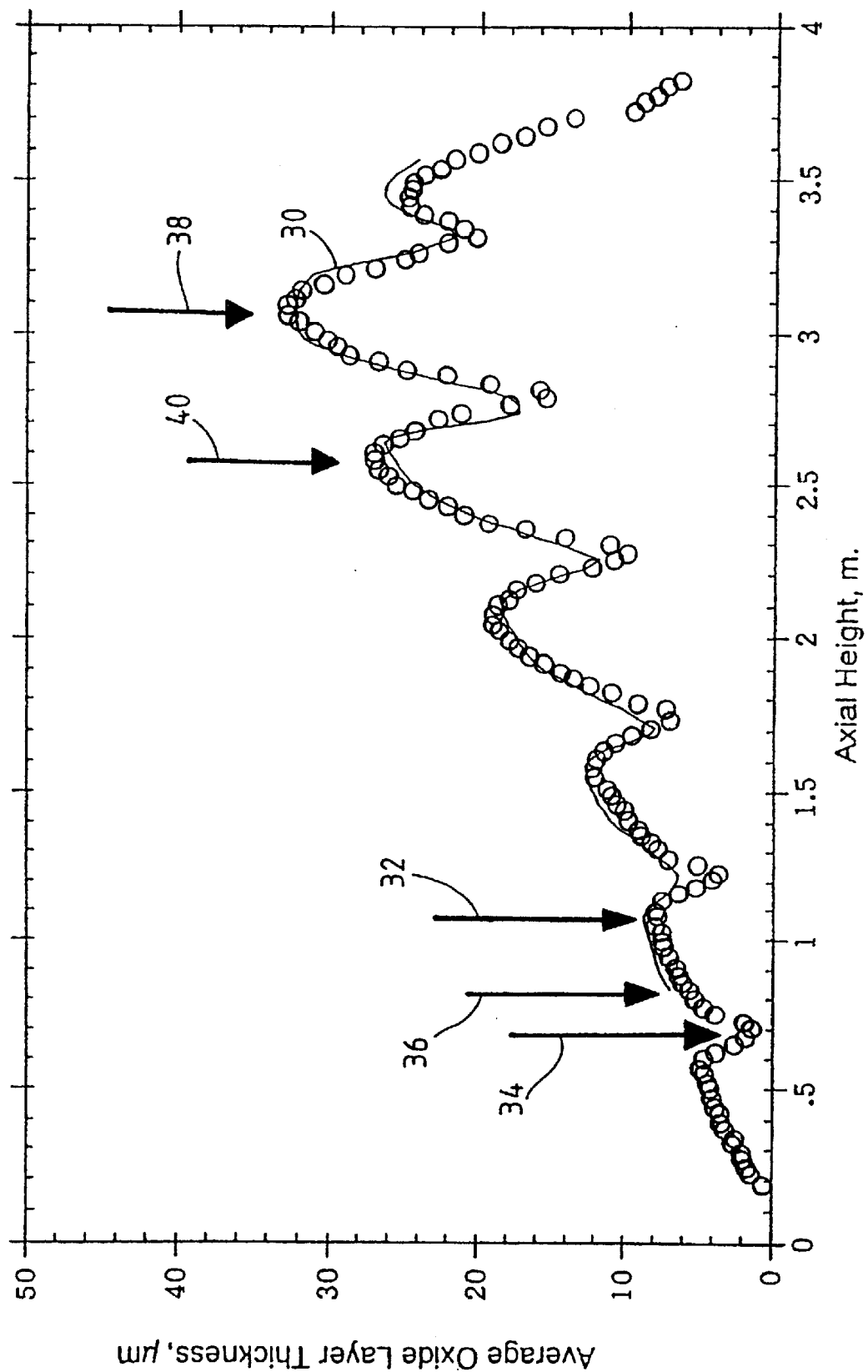
FIG. 2 shows a graph of average oxide layer thickness vs. axial position along a fuel rod from the coolant entry point.

Referring now to the drawings and where FIG. 1 shows a perspective view of a known fuel pin assembly 10, also called a fuel "element", for a PWR nuclear reactor core (not shown) and FIG. 2 shows a graph of average oxide layer thickness on fuel pin cladding. The assembly 10 comprises a plurality of fuel pins 12 arranged in a square array; top 14 and bottom 16 nozzles for locating the assembly in the reactor core; and, structural spacer grids 18 for aligning the pins 12 parallel to each other and to the assembly axis. The assembly shown in FIG. 1 is about 4 m in length, intervening parts 20 of the fuel pin length having been removed in the view shown. The structural spacer grids 18 have a plurality of apertures, each one accepting a fuel pin 12 or a thimble tube 22 (see FIGS. 3, 4 and 5) as appropriate and have resilient spring fingers (not able to be seen) in the apertures to grip the fuel pin to prevent any relative movement and consequent fretting damage: In operation, coolant water is pumped upwardly from the bottom nozzle 16 through the assembly 10 to exit via the top nozzle 14. Turbulence inducing vanes (not able to be seen) are provided on the grids 18 to promote mixing of the coolant and hence improve cooling of the fuel pins 12.

The graph of FIG. 2 does not relate to the specific fuel assembly 10 of FIG. 1 which is merely exemplary of fuel pin assemblies. FIG. 2 shows a curve 30 showing average oxide layer thickness on the cladding against axial position on the fuel pin 12. In the curve 30, maxima 32 and minima 34 (only one of each indicated by arrows for the sake of clarity) are shown at various positions along the fuel pin length. The fuel pin assembly corresponding to the curve 30 has structural spacer grids located at positions which lie between a maxima and the preceding minima, e.g. at position 36 and other corresponding positions. The greatest average oxide layer thickness occurs at the maxima 38 and represents an oxide thickness which is effectively life-limiting for the fuel pin. The ability to reduce the oxide thickness at this position, and also possibly at the preceding maxima 40, would enable the full burn-up potential of the fuel per se to be utilised or would allow the fuel assembly to operate at a higher power level or a combination of these advantages.

Figure 3:
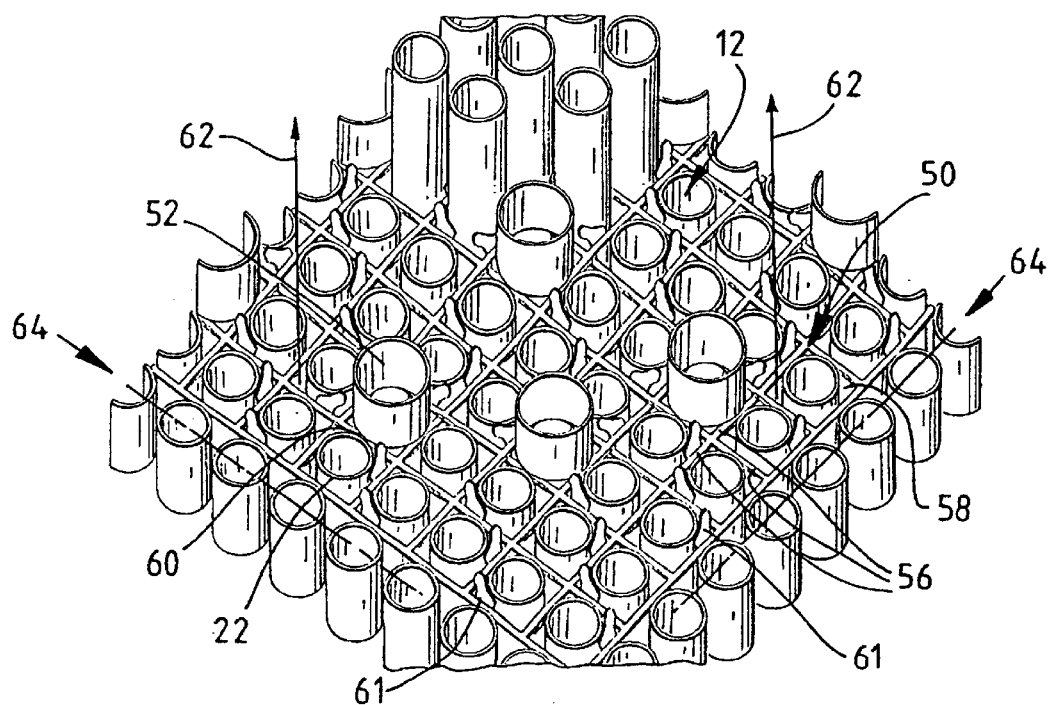
FIG. 3 shows a perspective view of a section of a fuel pin assembly according to a first embodiment of the present invention.

In the fuel pin assembly according to the present invention there is provided an additional grid 50 as shown in FIGS. 3 and 4, of which FIG. 3 shows a perspective view of part of the area of a short axial portion of a fuel pin assembly and FIG. 4 a plan view thereof. A plurality of fuel pins 12 are again shown, the fuel pin comprising an outer tubular sheath or cladding 22 which is filled with fuel material (not shown). Interspersed amongst the fuel pins 12 are thimble tubes 52 which receive control rods (not shown) to control the power output of the reactor. The grid 50 is stamped from sheet material such as Zircaloy (trade mark) and comprises a continuous framework 56 surrounding apertures 58 through which both the fuel pins 12 and thimble tubes 52 extend. However, the fuel pins 12 do not touch the framework 56 whereas the thimble tubes 52 are swaged outwardly at the location 60 where they pass through the apertures 58 so as to fixedly grip the framework 56 and thus locate the grid 50 in a desired position and orientation relative to the fuel pins 12. During the stamping operation, turbulence inducing means 61 in the form of vanes are integrally formed with the framework 56, the vanes being deflected away from the plane of the original sheet material during the forming operation to a desired configuration so as to optimise turbulence in the coolant water, indicated only schematically by the arrows 62, flowing through the fuel pin assembly 10. The grid 50 extends only up to the outer ring 64 of fuel pins since the outer ring of pins run at a lower temperature and have a consequently thinner oxide thickness layer. The grid 50 is positioned intermediate adjacent spacer grids 18 in the vicinity of the maxima 38 (and also possibly in the vicinity of maxima 40). The increased turbulence and improved coolant mixing caused by the grid 50 lowers the temperature of the fuel pins at this point and consequently also reduces the oxide thickness. The low volume or mass of the mixing grid 50 does not significantly increase the parasitic loss due to neutron capture.

Figure 5:
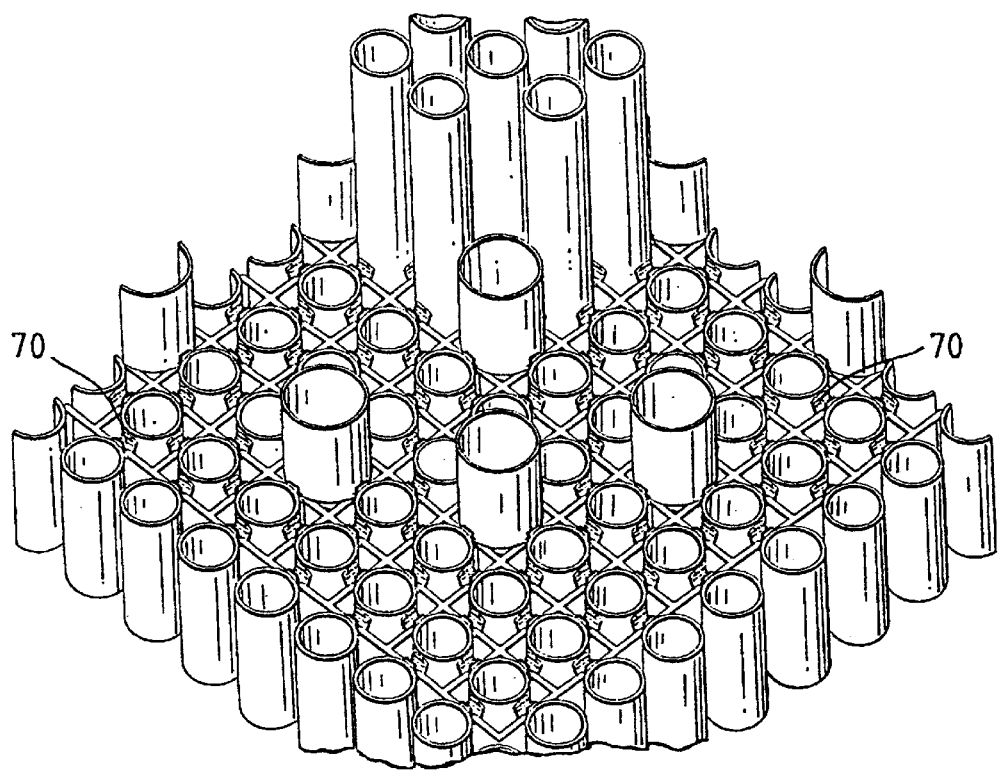
FIG. 5 shows a perspective view of a modified embodiment similar to that shown in FIG. 3.

FIG. 5 shows a slightly modified grid 50 having turbulence inducing vanes 70 of different form. Other features remain essentially the same as in FIGS. 2 and 3.

FIGS. 6 and 7 show a small part of the framework 56 of a grid 50. In this modification, some or all of the individual framework members 80 are twisted out of the plane of the original sheet from which the grid is stamped or pressed to an angle so as to promote turbulence in the coolant thereby. Vanes as described above with reference to FIGS. 3, 4 and 5 may or may not be employed depending upon the specific geometry and requirements of the fuel assembly 10 in question.

What is claimed is:

1. A fuel assembly for a nuclear reactor including: a plurality of fuel pins having respective axes extending substantially parallel to each other; at least two structural grids spaced apart from each other, the structural grids being in contact with said fuel pins and maintaining said fuel pins substantially mutually parallel and preventing contact therebetween, wherein the fuel assembly further comprises at least one mixing grid situated intermediate said at least two structural grids, said mixing grid having turbulence inducing means to promote turbulence in a coolant flowing through said fuel assembly in use, wherein said mixing grid is positioned and fixedly located out of contact with said fuel pins and wherein the mixing grid is formed from a single sheet of metal wherein the plane of the metal sheet from which the mixing grid is formed lies in a plane which is transverse to the axes of the fuel pins.

2. A fuel assembly according to claim 1, wherein the thickness of the sheet material is lies in the range from 0.5 mm to about 1 mm.

3. A fuel assembly according to claim 1 wherein the mixing grid is in the form of a framework having an array of apertures of predetermined size and shape.

4. A fuel assembly according claim 1 wherein the turbulence inducing means include vanes attached to the mixing grid.

5. A fuel assembly according to claim 1 wherein the vanes are integrally formed with the mixing grid.

6. A fuel assembly according to claim 3 wherein the framework includes framework members surrounding each aperture and wherein at least some of the framework members surrounding each aperture are twisted out of the plane of the sheet so as to form turbulence inducing features.

7. A fuel assembly according to claim 1 wherein the mixing grid does not extend to and encompass an outer peripheral ring of fuel pins.

8. A fuel assembly according to claim 1 wherein the mixing grid is located and held in position within the fuel pin assembly by thimble tubes in which moderator control rods run.

9. A fuel assembly according to claim 8 wherein the mixing grid is located by swaging to the thimble tubes.

10. A fuel assembly according to claim 8 wherein the mixing grid is first joined to short tubes which are fitted over the thimble tubes and are fixed to the thimble tubes.

11. A fuel assembly according to claim 1 wherein the mixing grid is located at a position between two adjacent structural grids where, during operation of the reactor in use, the hottest region of the fuel pins is located.

12. A mixing grid for use in a fuel pin assembly including a plurality of fuel pins having respective axes extending substantially parallel to each other, at least two structural grids spaced apart from each other, the structural grids being in contact with the fuel pins and maintaining the fuel pins substantially mutually parallel and preventing contact therebetween, said mixing grid including turbulence inducing means to promote turbulence in a coolant flowing through the fuel assembly in use and wherein:

said mixing grid is formed from a single sheet of metal;

said mixing grid is sized and configured to be situated intermediate said at least two structural grids, positioned and fixedly located out of contact with said fuel pins, and such that, when said mixing grid is so positioned, the plane of the metal sheet from which the mixing grid is formed lies in a plane which is transverse to the axes of the fuel pins.

13. A fuel assembly according to claim 8 wherein the mixing grid is located by welding to the thimble tube.

\* \* \* \* \*